April 6, 1948.  T. V. BUCKWALTER  2,439,284

LOCOMOTIVE ECCENTRIC CRANK PIN BEARING

Filed Aug. 24, 1944

INVENTOR:
Tracy V. Buckwalter,
by Carr Harr & Gravely,
HIS ATTORNEYS.

Patented Apr. 6, 1948

2,439,284

UNITED STATES PATENT OFFICE 2,439,284

LOCOMOTIVE ECCENTRIC CRANKPIN BEARING

Tracy V. Buckwalter, Massillon, Ohio, assignor to The Timken Roller Bearing Company, Canton, Ohio, a corporation of Ohio Application August 24, 1944, Serial No. 550,963

9 Claims. (Cl. 308—207)

This invention relates to bearings, particularly roller bearings for the eccentric crank pins of locomotive valve gears. It has for its principal objects to provide for the easy application to and removal from the eccentric crank pin of the roller bearing and eccentric rod, to provide for supporting the cages and the rollers retained thereby against centrifugal movement, and to provide for simplicity and cheapness of construction and compactness of design. The invention consists in the locomotive roller bearing eccentric crank pin construction and in the construction, combinations and arrangements of parts hereinafter described and claimed.

Figure 1:
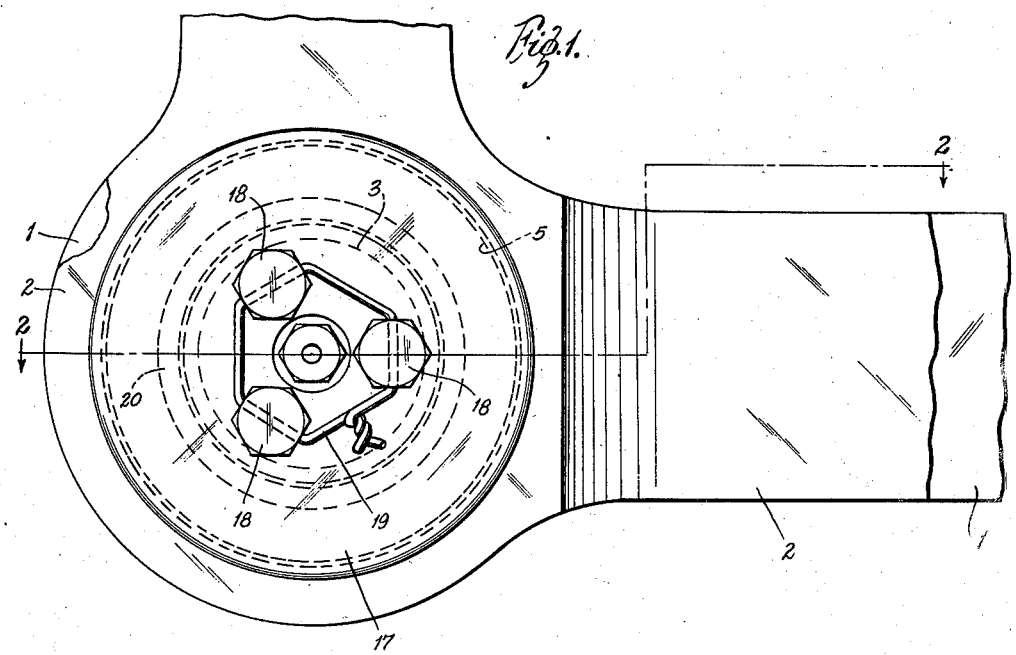
Figure 2:
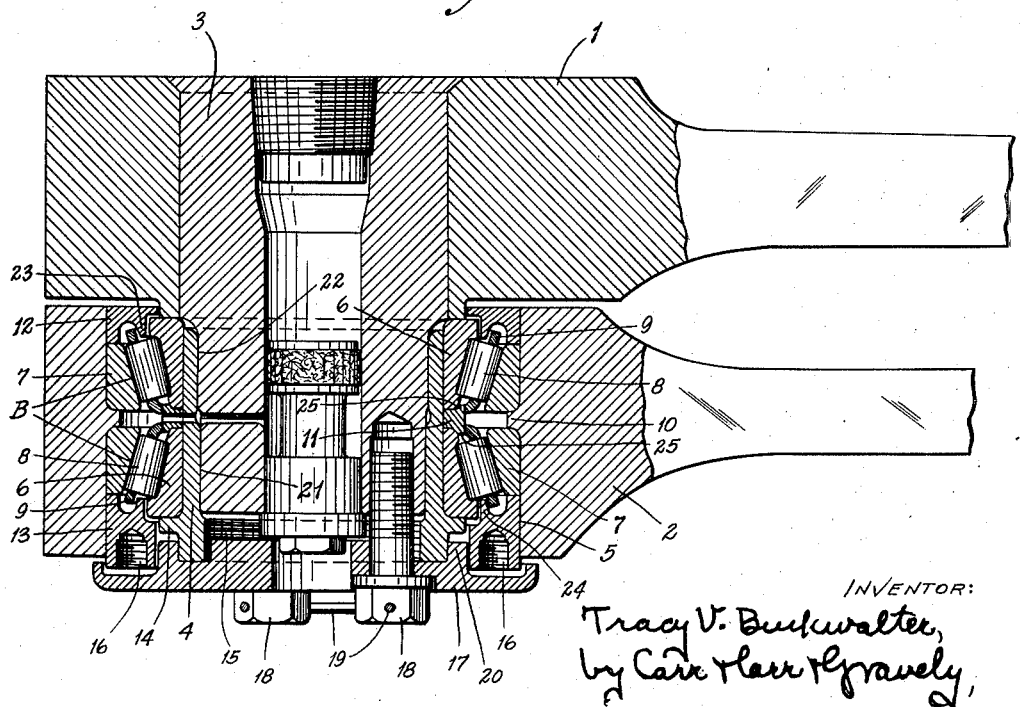

In the accompanying drawing, which forms part of this specification and wherein like symbols refer to like parts wherever they occur, Fig. 1 is a fragmentary side elevational view of the adjacent ends of the eccentric crank and eccentric rod of a locomotive valve gear provided with a roller bearing eccentric crank pin construction embodying my invention; and Fig. 2 is a central longitudinal sectional view on the line 2—2 in Fig. 1.

In the accompanying drawing, my invention is shown embodied in a locomotive valve gear, of which only the cooperating end portions of the eccentric crank 1 and the eccentric rod 2 are shown, said eccentric crank and rod being connected, respectively, to the main crank pin (not shown) of the locomotive and the link (not shown) of said valve gear. In accordance with common practice, the outer end of the eccentric arm 1 has an eccentric crank pin 3 rigid therewith which supports the eccentric rod 2 and travels in a circular path of smaller diameter than the path of the main crank pin. The projecting end of the eccentric crank pin 3 has a sleeve 4 press-fitted thereon adapted to support two axially spaced taper roller bearings B; and the eccentric rod has an eye 5 therein by which it is adapted to be mounted on said bearings.

Each of the roller bearings comprises a cone or inner bearing member 6 mounted on the sleeve 4, a cup or outer bearing member 7 seated in the eye 5 of the eccentric rod 2, a circular series of conical bearing rollers 8 interposed between said cone and cup, and a cage 9 for spacing said series of bearing rollers and for restraining them against radial outward movement. As shown in the drawing, the rollers 8 of the two bearings B taper towards each other, the adjacent ends of the cups 7 are disposed in abutting relation to an internal annular spacing rib 10 in the eye 5 of the eccentric rod 2, and the adjacent ends of the cones 6 are disposed in endwise abutting relation to a spacing ring 11 sleeved on the bearing supporting sleeve 4.

The cup 7 of the innermost bearing is held in abutting relation to the annular rib 10 in the eye 5 of the eccentric rod 2 by means of an abutment ring 12 that is press-fitted in the inner end of said eye in abutting relation to the adjacent end of said cup; and the cup of the outermost bearing is held in abutting relation to said annular rib by means of an abutment ring 13 that is press-fitted in the outer end of said eye in abutting relation to said cup of said outermost bearing. The cones 6 of the two bearings and the spacing ring 11 for said cones are clamped together in endwise abutting relation on the supporting sleeve 4 therefor between the outer side face of the eccentric crank 1 and an outstanding annular abutment rib 14 formed on said sleeve adjacent to the outer end thereof.

The cone supporting sleeve 4 extends beyond the outer end of the eccentric crank pin 3 where it is threaded internally, as at 15, to receive a suitable pulling tool (not shown) for withdrawing said sleeve endwise from said eccentric crank pin. The outermost abutment ring 13 has a circular series of threaded holes 16 in the outer face thereof that are also adapted to receive a suitable pulling implement (not shown) for withdrawing said abutment ring from the outer end of the eye 5 of the eccentric rod 2.

The outer ends of the eccentric crank pin 3, the cone supporting sleeve 4 and the outermost abutment ring 13 are covered by a circular retaining plate 17 which is rigidly secured to the eccentric crank pin 3 by means of a circular group of cap screws 18 that extend through holes provided therefor in said plate and are threaded into said eccentric pin. The screws 18 are prevented from working loose by means of a lock wire 19 which extends through diametral holes in the heads of said screws and has its ends twisted together. As shown in the drawing, the retaining and cover plate 17 is pressed endwise against the outer end of the cone supporting sleeve 4 by the securing screws 18 for said plate; and said plate has a concentric rib 20 on the inner face thereof that snugly fits around and supports said cone supporting sleeve outwardly of the eccentric crank pin 3.

As shown in the drawing, approximately the outermost half of the press-fitted surfaces 21 of the eccentric crank pin 3 and the sleeve 4 are of smaller diameter than their innermost portions 22. The purpose of these two diameter press-fitted portions of the eccentric crank pin 3 and cone supporting sleeve 4 is to simplify the operations of pressing said sleeve on said pin and removing it therefrom, this construction reducing by approximately one-half the force required to press the sleeve on the crank pin and remove it therefrom.

The innermost abutment ring 12 has an annular rib 23 on the inner face thereof that extends into the adjacent end of the roller retaining cage 9 of the outermost bearing, the outermost abutment ring 13 also has a similar annular rib 24 that extends into the inner end of the cage of the innermost bearing, and the spacing ring 11 for the cones 6 of the two bearings also has annular ribs 25 at the opposite ends thereof that fit within the adjacent ends of the cages of the respective bearings. By this arrangement, the cages and the bearing rollers retained thereby are supported at both ends against centrifugal movement due to the circular path of travel of the eccentric crank pin 3 around the axis of the main driving wheel (not shown) of the locomotive.

The hereinbefore described roller bearing construction has several important advantages. The two diameter press-fitted surfaces of the eccentric crank pin and cone supporting sleeve greatly reduce the force required to press said sleeve on said crank pin and to remove it therefrom, this arrangement permitting the sleeve to be slipped half way on the pin before press fit resistance is encountered and permitting the press fit to be entirely released and the parts to be removed by hand when the sleeve is withdrawn halfway from the crank pin. Outward movement of the cone supporting sleeve on the eccentric crank pin is prevented by means of the retaining cap that is fixed to the outer end of said pin in endwise abutting relation to the outer end of said sleeve; and the projecting outer end of said sleeve is rigidly supported by said plate. The ribs on the end closure rings and the cone spacing ring provide adequate support for the cages and the rollers retained thereby against centrifugal movement due to the heavy centrifugal load on the cages resulting from the circular path of travel of the eccentric crank pin and the bearings thereon about the axis of the main drive wheel of the locomotive.

Obviously, the hereinbefore described bearing construction admits of considerable modification without departing from the invention. Therefore, I do not wish to be limited to the precise construction shown and described.

What I claim is:

1. A locomotive eccentric crank pin bearing comprising an eccentric crank having an eccentric cylindrical crank pin rigid therewith, an eccentric rod having an eye surrounding said pin, an internally cylindrical sleeve press-fitted on said pin, and a rotary anti-friction bearing interposed between said eye and sleeve, the cooperating cylindrical surfaces of said pin and sleeve having outermost portions of smaller diameter than their innermost portions.

2. A locomotive eccentric crank pin bearing comprising an eccentric crank having an eccentric cylindrical crank pin rigid therewith, an eccentric rod having an eye surrounding said pin, an internally cylindrical sleeve press-fitted on said pin, and a rotary anti-friction bearing interposed between said eye and sleeve, the cooperating cylindrical surfaces of said pin and sleeve having approximately the outermost half thereof of smaller diameter than their innermost portions.

3. A locomotive eccentric crank pin bearing comprising an eccentric crank having an eccentric crank pin rigid therewith, an eccentric rod having an eye surrounding said pin, a rotary anti-friction bearing interposed between said pin and eye, said bearing including a series of rollers and a cage for said rollers for restraining them against radial outward movement, and means sustained by said pin and eye and cooperating with opposite ends of said cage for resisting centrifugal movement of said cage and rollers with respect to the center of revolution of said eccentric crank pin.

4. A locomotive eccentric crank pin bearing comprising an eccentric crank having an eccentric crank pin rigid therewith, an eccentric rod having an eye surrounding said pin, a sleeve press-fitted on said pin and having a portion extending beyond the outer end thereof and shaped to receive a pulling implement, a rotary anti-friction bearing interposed between said eye and sleeve, and a retaining member secured to the outer end of said pin in endwise abutting relation to the outer end of said sleeve and providing radial support therefor.

5. A locomotive eccentric crank pin bearing comprising an eccentric crank having an eccentric crank pin rigid therewith, an eccentric rod having an eye surrounding said pin, a sleeve press-fitted on said pin and having a portion extending beyond the outer end thereof and shaped to receive a pulling implement, a rotary anti-friction bearing interposed between said eye and sleeve, the cooperating surfaces of said pin and sleeve having outermost portions of smaller diameter than their innermost portions, and a retaining member secured to the outer end of said pin in endwise abutting relation to the outer end of said sleeve and providing radial support therefor.

6. A locomotive eccentric crank pin bearing comprising an eccentric crank having an eccentric crank pin rigid therewith, an eccentric rod having an eye surrounding said pin, two axially spaced rotary antifriction bearings interposed between said pin and eye, each of said bearings including a series of bearing rollers and a cage for said rollers for restraining them against radial outward movement, and rings sustained by said pin and eye and extending into opposite ends of each of said cages for resisting centrifugal movement of said cages and rollers with respect to the center of revolution of said eccentric crank pin.

7. A locomotive eccentric crank pin bearing comprising an eccentric crank having an eccentric crank pin rigid therewith, an eccentric rod having an eye surrounding said pin, a sleeve press-fitted on said pin, and two axially spaced rotary anti-friction bearings interposed between said eye and sleeve, each of said bearings including an inner raceway member mounted on said sleeve, an outer raceway member mounted in said eye, rollers between said inner and outer raceway members and a retaining cage for said rollers, abutment rings mounted in said eye in abutting relation to the remote ends of the cups of said bearings, a spacing ring mounted on said sleeve between adjacent ends of said cones, and means on said abutment rings and said spacing ring extending into the adjacent ends of said cages for resisting centrifugal movement thereof.

8. A locomotive eccentric crank pin bearing comprising an eccentric crank having an eccentric crank pin rigid therewith, an eccentric rod having an eye surrounding said pin, a sleeve press-fitted on said pin, and two axially spaced rotary antifriction bearings interposed between said eye and sleeve, each of said bearings including an inner raceway member mounted on said sleeve, an outer raceway member mounted in said eye, rollers between said inner and outer raceway members and a retaining cage for said rollers, abutment rings mounted in said eye in abutting relation to the remote ends of the cups of said bearings, a plate fixed to the outer end of said pin in endwise abutting relation to the outer end of said sleeve, and a spacing ring mounted on said sleeve between adjacent ends of said cones, said abutment rings and said spacing ring having annular ribs on the inner faces thereof extending into the adjacent ends of said cages for resisting centrifugal movement thereof.

9. A rotary antifriction bearing construction comprising relatively rotatable inner and outer members, a sleeve press-fitted on said inner member and having a portion extending beyond one end thereof and shaped to receive a pulling implement, a roller bearing interposed between said outer member and sleeve, the cooperating surfaces of said inner member and sleeve being of smaller diameter at one end thereof than at the other end thereof, and a retaining member secured to said first mentioned end of said inner member in endwise abutting relation to the extended end of said sleeve and providing radial support therefor.

TRACY V. BUCKWALTER.

REFERENCES CITED

The following references are of record in the file of this patent:

UNITED STATES PATENTS

| Number | Name | Date |
| --- | --- | --- |
| 1,765,705 | Smith | June 24, 1930 |
| 1,820,017 | Foulks | Aug. 25, 1931 |
| 1,886,014 | Hastings | Nov. 1, 1932 |
| 1,941,460 | Boden | Jan. 2, 1934 |
| 1,949,824 | Buckwalter | Mar. 6, 1934 |
| 2,071,628 | Hedgcock | Feb. 23, 1937 |
| 2,215,741 | Palmgren | Sept. 24, 1940 |

FOREIGN PATENTS

| Number | Country | Date |
| --- | --- | --- |
| 262,751 | Great Britain | Mar. 24, 1927 |
| 445,542 | Germany | June 14, 1927 |